United States Patent
Sunil Kumar et al.

(10) Patent No.: US 10,612,932 B2
(45) Date of Patent: Apr. 7, 2020

(54) METHOD AND SYSTEM FOR CORRECTING A PRE-GENERATED NAVIGATION PATH FOR AN AUTONOMOUS VEHICLE

(71) Applicant: WIPRO LIMITED, Bangalore (IN)

(72) Inventors: Balaji Sunil Kumar, Bengaluru (IN); Manas Sarkar, Kolkata (IN); Shyam Sundar Pal, Kolkata (IN)

(73) Assignee: Wipro Limited, Bangalore (IN)

( * ) Notice: Subject to any disclaimer, the term of this patent is extended or adjusted under 35 U.S.C. 154(b) by 129 days.

(21) Appl. No.: 15/818,923

(22) Filed: Nov. 21, 2017

(65) Prior Publication Data
US 2019/0101399 A1 Apr. 4, 2019

(30) Foreign Application Priority Data
Sep. 29, 2017 (IN) .............................. 201741034784

(51) Int. Cl.
*G01C 21/34* (2006.01)
*G05D 1/02* (2020.01)
(Continued)

(52) U.S. Cl.
CPC ......... *G01C 21/3415* (2013.01); *G01C 21/32* (2013.01); *G01S 17/89* (2013.01);
(Continued)

(58) Field of Classification Search
CPC ..... G01C 21/3415; G01C 21/32; G01S 17/89; G05D 1/0212; G05D 1/024; G05D 1/0274; G05D 2201/0213; G06K 9/00791
See application file for complete search history.

(56) References Cited

U.S. PATENT DOCUMENTS

| 8,825,259 B1 | 9/2014 | Ferguson |
| 9,285,230 B1 | 3/2016 | Silver et al. |

(Continued)

FOREIGN PATENT DOCUMENTS

EP   1302747 A1   4/2003

OTHER PUBLICATIONS

Extended European Search Report issued in the European Patent Office in counterpart European Application No. 17209574.7, dated Aug. 7, 2018, 8 pages.

*Primary Examiner* — Calvin Cheung
(74) *Attorney, Agent, or Firm* — Finnegan, Henderson, Farabow, Garrett & Dunner, LLP

(57) ABSTRACT

This disclosure relates generally to autonomous vehicle, and more particularly to method and system for correcting a pre-generated navigation path for an autonomous vehicle. In one embodiment, a method may be provided for correcting the pre-generated navigation path for the autonomous vehicle. The method may include receiving the pre-generated navigation path on a navigation map, an environmental field of view (FOV) of the autonomous vehicle, and a location of the autonomous vehicle on the pre-generated navigation path. The method may further include determining a set of new data points in a pre-defined region with respect to the location of autonomous vehicle based on the environmental FOV and the navigation map, determining an offset of the pre-generated navigation path in the pre-defined region based on the set of new data points, and correcting the pre-generated navigation path in the pre-defined region based on the offset.

18 Claims, 8 Drawing Sheets

(51) Int. Cl.
*G01C 21/32* (2006.01)
*G06K 9/00* (2006.01)
*G01S 17/89* (2020.01)

(52) U.S. Cl.
CPC .......... *G05D 1/024* (2013.01); *G05D 1/0212* (2013.01); *G05D 1/0274* (2013.01); *G06K 9/00791* (2013.01); *G05D 2201/0213* (2013.01)

(56) References Cited

U.S. PATENT DOCUMENTS

| | | | |
|---|---|---|---|
| 2015/0260526 A1* | 9/2015 | Paduano | G01C 21/20 |
| | | | 701/461 |
| 2016/0282468 A1* | 9/2016 | Gruver | H05K 999/99 |
| 2017/0248963 A1* | 8/2017 | Levinson | G01C 21/32 |
| 2019/0050000 A1* | 2/2019 | Kennedy | G05D 1/101 |

* cited by examiner

METHOD AND SYSTEM FOR CORRECTING A PRE-GENERATED NAVIGATION PATH FOR AN AUTONOMOUS VEHICLE

TECHNICAL FIELD

This disclosure relates generally to autonomous vehicle, and more particularly to method and system for correcting a pre-generated navigation path for an autonomous vehicle.

BACKGROUND

Autonomous vehicles may facilitate efficient transportation in coming times. The autonomous vehicle may be capable of sensing the dynamic changing environment, and of navigating without any human intervention. The autonomous vehicle may typically employ a navigation path generated on a highresolution navigation map (e.g., a light detection and ranging (LIDAR) map) for performing autonomous navigation. The path planning of the autonomous vehicle therefore depends on accuracy of the navigation path, which in turn depends on completeness of the navigation map of the territory where the vehicle may eventually run.

However, many a times, while creating the navigation map, information captured is not accurate and therefore the map is incomplete. For example, in some scenarios, non-drivable area just beside the road (e.g., pedestrian area, cycling track, etc.) does not get detected on the navigation map due to negligible number of pedestrians or cyclists, absence of segregating structure, and/or other reasons. Further, many a times, information captured and therefore the navigation map is outdated. For example, a temporary or a permanent structure (e.g., a segregating structure) may have come up since the last creation of the navigation map. Maintaining and updating the mapped locality with all its continuous changes may require effort and may also involve cost.

The navigation path generated based on such incomplete or outdated navigation map may therefore not be accurate for performing autonomous navigation. For example, in some occasions, the inaccurate navigation path generated on the incomplete or outdated navigation map may result in the autonomous vehicle being very near to the potential hitting zone making the navigation unsafe. Thus, existing techniques to provide high precision map and accurate navigation path for autonomous vehicle are effort and resource intensive, and involve huge cost.

SUMMARY

In one embodiment, a method for correcting a pre-generated navigation path for an autonomous vehicle is disclosed. In one example, the method may include receiving the pre-generated navigation path on a navigation map, an environmental field of view (FOV) of the autonomous vehicle, and a location of the autonomous vehicle on the pre-generated navigation path. The method may further include determining a set of new data points in a pre-defined region with respect to the location of autonomous vehicle based on the environmental FOV and the navigation map. The method may further include determining an offset of the pre-generated navigation path in the pre-defined region based on the set of new data points. The method may further include correcting the pre-generated navigation path in the pre-defined region based on the offset.

In one embodiment, a system for correcting a pre-generated navigation path for an autonomous vehicle is disclosed. In one example, the system may include at least one processor and a memory communicatively coupled to the at least one processor. The memory may store processor-executable instructions, which, on execution, may cause the processor to receive the pre-generated navigation path on a navigation map, an environmental field of view (FOV) of the autonomous vehicle, and a location of the autonomous vehicle on the pre-generated navigation path. The processor-executable instructions, on execution, may further cause the processor to determine a set of new data points in a pre-defined region with respect to the location of autonomous vehicle based on the environmental FOV and the navigation map. The processor-executable instructions, on execution, may further cause the processor to determine an offset of the pre-generated navigation path in the pre-defined region based on the set of new data points. The processor-executable instructions, on execution, may further cause the processor to correct the pre-generated navigation path in the pre-defined region based on the offset.

In one embodiment, a non-transitory computer-readable medium storing computer-executable instructions for correcting a pre-generated navigation path for an autonomous vehicle is disclosed. In one example, the stored instructions, when executed by a processor, may cause the processor to perform operations including receiving the pre-generated navigation path on a navigation map, an environmental field of view (FOV) of the autonomous vehicle, and a location of the autonomous vehicle on the pre-generated navigation path. The operations may further include determining a set of new data points in a pre-defined region with respect to the location of autonomous vehicle based on the environmental FOV and the navigation map. The operations may further include determining an offset of the pre-generated navigation path in the pre-defined region based on the set of new data points. The operations may further include correcting the pre-generated navigation path in the pre-defined region based on the offset.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
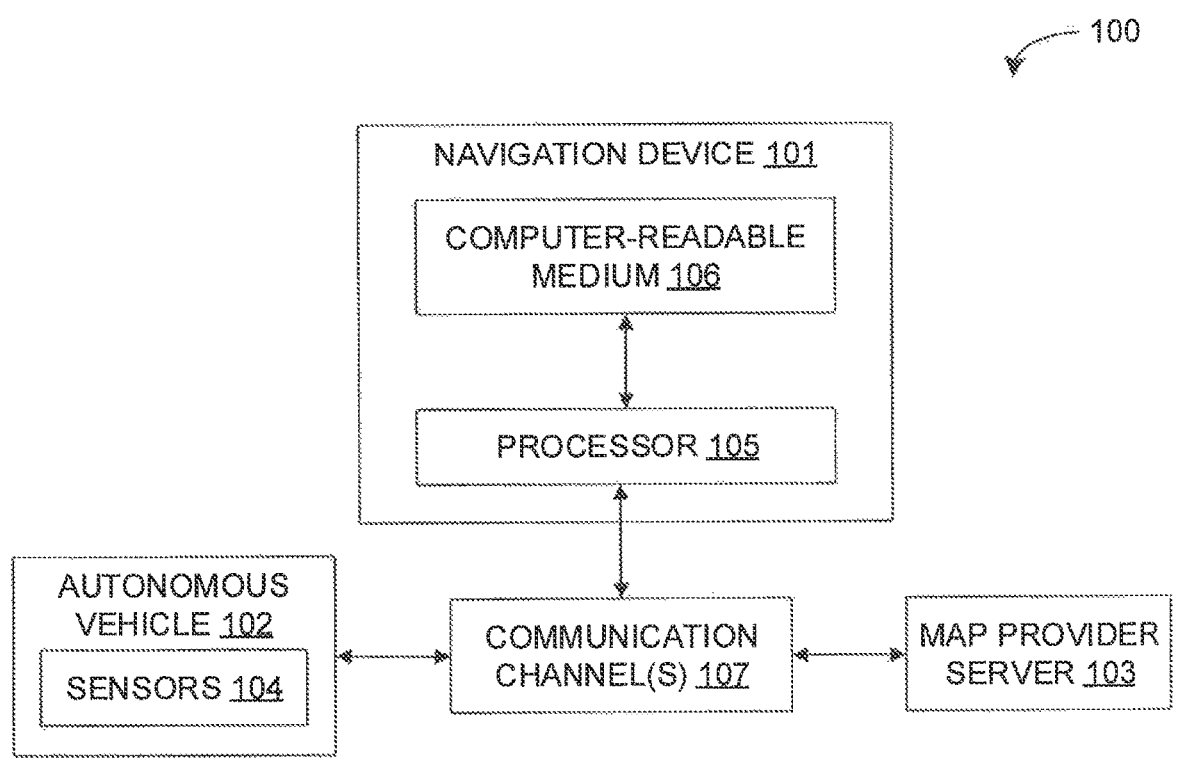
FIG. 1 is a block diagram of an exemplary system for correcting a pre-generated navigation path for an autonomous vehicle in accordance with some embodiments of the present disclosure.

Referring now to FIG. 1, an exemplary system 100 for correcting a pre-generated navigation path for an autonomous vehicle is illustrated in accordance with some embodiments of the present disclosure. In particular, the system 100 may include a navigation device 101, an autonomous vehicle 102, and a map provider server 103. The navigation device 101 may receive a pre-generated navigation path on a navigation map from the map provider server 103, and may correct the pre-generated navigation path for the autonomous vehicle 102. As will be appreciated by those skilled in the art, the map provider server 103 may be a server of any service provider that may provide a high-resolution navigation map of the region (i.e., a detailed geographic map of the region) along with the navigation path between a source and a destination. It should be noted that, in some embodiments, the high-resolution navigation map may be a LIDAR map in terms of data point cloud of the region, and the navigation path may be in terms of Cartesian coordinate point array on the navigation map.

Further, as will be appreciated by those skilled in the art, the autonomous vehicle 102 may be any vehicle capable of sensing the dynamic changing environment, and of navigating without any human intervention. Thus, the autonomous vehicle 102 may include at least a number of sensors 104, a vehicle drivetrain, and a processor based control system, among other components. The one or more sensors 104 may enable sensing of the dynamic changing environment, and may include a global positioning system (GPS) sensor, an inertia measurement unit (IMU), a laser scanner, a light detection and ranging (LIDAR) scanner, a short range radar, a camera, an ultrasonic sensor, a odometer, and so forth. The one or more sensors 104 may capture various sensor parameters such as current position (location) and orientation (pose or direction) of the autonomous vehicle 102 within a global reference frame, a 360 degree field of view (FOV) of the environment, an image of the environment, a presence of any other object in the vicinity of the autonomous vehicle 102, and so forth. As will be appreciated, the sensor parameters may enable the navigation device 101 to locate the autonomous vehicle 102 on the pre-generated navigation map, and to correct the pre-generated navigation path for the autonomous vehicle 102. The processor based control system may receive sensors parameters from the sensors 104 so as to identify appropriate navigation path and obstacle of the dynamically changing environment. The processor based control system may process sensor data, and may accordingly control the vehicle drivetrain.

As will be appreciated, the pre-generated navigation path may not be accurate for performing autonomous navigation due to it being generated based on incomplete or outdated navigation map. It is therefore desirable to correct the pre-generated navigation path for the autonomous vehicle 102 so as to keep the autonomous vehicle 102 at a safe distance from the potentially high pedestrian boundary or other similar obstacles which had not been captured on the navigation map. The navigation device 101 may therefore implement a navigation path correction engine for correcting the pre-generated navigation path for the autonomous vehicle 102 in accordance with some embodiments of the present disclosure. As will be described in greater detail in conjunction with FIG. 2, the navigation path correction engine may receive the pre-generated navigation path on a navigation map from the map provider server 103, receive an environmental field of view (FOV) of the autonomous vehicle 102 from the sensors 104, and receive or determine a location of the autonomous vehicle 102 on the pre-generated navigation path based on sensor parameters received from the sensors 104. The navigation path correction engine may further determine a set of new data points in a pre-defined region with respect to the location of autonomous vehicle 102 based on the environmental FOV and the navigation map, determine an offset of the pre-generated navigation path in the pre-defined region based on the set of new data points, and correcting the pre-generated navigation path in the pre-defined region based on the offset.

The navigation device 101 may include one or more processors 105, and a computer-readable medium (e.g., a memory) 106. The computer-readable medium 106 may store instructions that, when executed by the one or more processors 105, may cause the one or more processors 105 to correct the pre-generated navigation path for the autonomous vehicle 102 in accordance with aspects of the present disclosure. The computer-readable storage medium 106 may also store multiple sensor parameters captured by the sensors 104 and other data as required or as processed by the navigation device 101 or the system 100. The one or more processors 105 may perform data processing functions so as to receive the pre-generated navigation path, receive the navigation map, receive the environmental FOV, receive or determine the location, determine the new data points, determine the offset, and correct the pre-generated navigation path.

Each of the navigation device 101, the autonomous vehicle 102, and the map provider server 103 may interact among each other over various communication channels 107. For example, in some embodiments, the navigation device 101 may receive the navigation map along with the pre-generated navigation path from the map provider server 103 over a communication channel 107, and may receive sensor parameters from the autonomous vehicle 102 over a separate communication channel 107. Alternatively, in some embodiments, the autonomous vehicle 102 may receive the navigation map along with the pre-generated navigation path from the map provider server 103 over a communication channel 107, while the navigation device 101 may receive sensor parameters as well as the navigation map along with the pre-generated navigation path from the autonomous vehicle 102 over a separate communication channel 107. Further, in some embodiments, the autonomous vehicle 102 may receive the corrected navigation path from the navigation device 101 over the communication channel 107. In some embodiments, the autonomous vehicle 102 may also receive the navigation map along with the pre-generated navigation path from the navigation device 101 over the communication channel. Alternatively, in some embodiments, the autonomous vehicle 102 may receive navigation instructions (e.g., the corrected navigation path and sequence of command velocity) from the navigation device 101. The communication channel 107 may be any wired or wireless communication channel based on different communication technologies (e.g., satellite communication technology, television communication technology, mobile communication technologies, WiFi, WiMax, optical fibre, coaxial cable, universal serial bus (USB), high-definition multimedia interface (HDMI), Bluetooth, and so forth).

As will be appreciated, in some embodiments, the navigation device 101 may be located locally with respect to the autonomous vehicle 102. For example, in some embodiments, the navigation device 101 may be a separate device in communication with the autonomous vehicle 102. Alternatively, in some embodiments, the navigation device 101 may be embedded within the autonomous vehicle 102. Further, as will be appreciated, in some embodiments, the navigation device 101 may be located remotely with respect to the autonomous vehicle 102. For example, in some embodiments, the navigation device 101 may be located in a remote server of a navigation service provider. Alternatively, in some embodiments, the navigation device 101 may be embedded within the map provider server 103.

Further, as will be appreciated, in some embodiments, various components of the navigation device 101 may be physically located together in one device. Alternatively, in some embodiments, the components of the navigation device 101 may be physically distributed across various devices. For example, the processors 105 and the computer readable medium 106 of the navigation device 101 may be physically located together in one device (e.g., the navigation device 101) or may be physically distributed across various devices (e.g., the navigation device 101, the autonomous vehicle 102, and/or the map provider server 103). Similarly, in some embodiments, some or all of the sensors 104 may be a part of the navigation device 101 even though they may be located in the autonomous vehicle 102.

Figure 2:
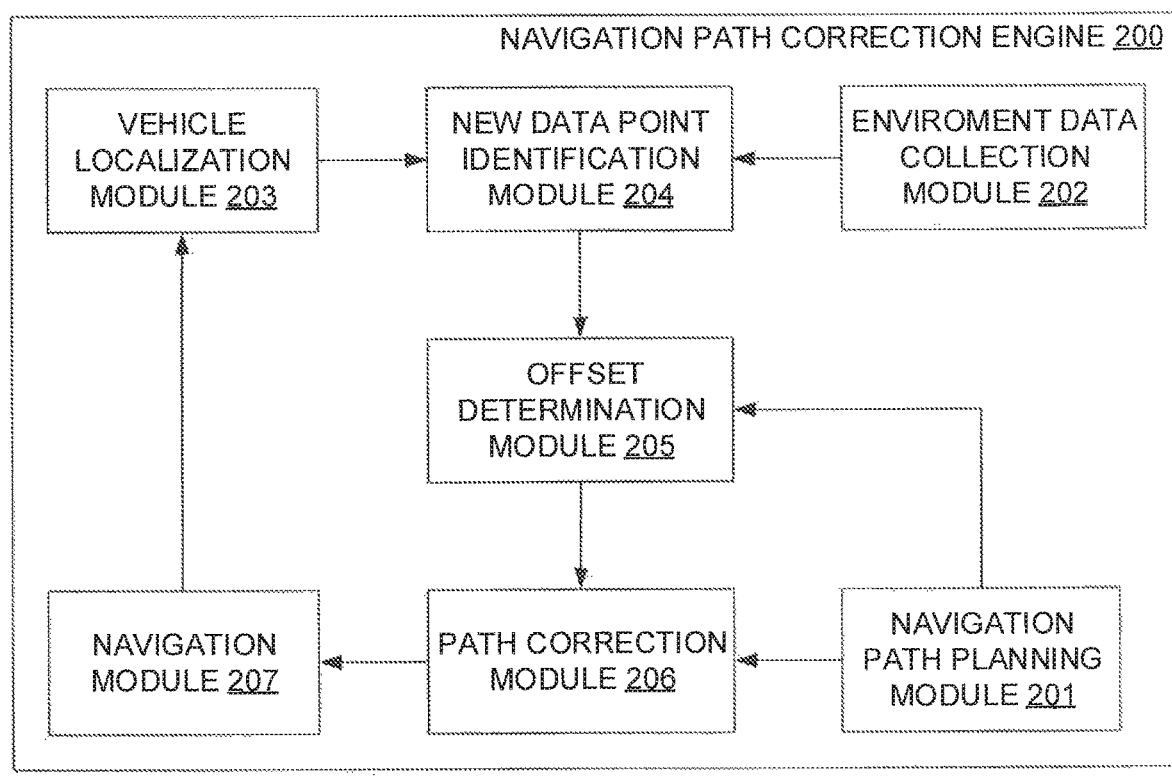
FIG. 2 is a functional block diagram of a navigation path correction engine in accordance with some embodiments of the present disclosure.

Referring now to FIG. 2, a functional block diagram of the navigation path correction engine 200 implemented by the navigation device 101 of the system 100 of FIG. 1 is illustrated in accordance with some embodiments of the present disclosure. The navigation path correction engine 200 may include various modules that perform various functions so as to correct the pre-generated navigation path for the autonomous vehicle. In some embodiments, the navigation path correction engine 200 includes a navigation path planning module 201, an environment data collection module 202, a vehicle localization module 203, a new data point identification module 204, an offset determination module 205, a path correction module 206, and a navigation module 207. As will be appreciated by those skilled in the art, each of the modules 201-207 may reside, in whole or in parts, on any of the navigation device 101, the autonomous vehicle 102, or the map provider server 103.

The navigation path planning module 201 may receive the pre-generated navigation path between a source and a destination on the navigation map from the map provider server or from a local storage. It should be noted that the pre-generated navigation path on the navigation map in the local storage may be from the map provider server either from an earlier instance or from a prior request (e.g., prior to start of the navigation). Alternatively, the navigation path planning module 201 may receive the navigation map from the map provider server or from a local storage, and generate the navigation path between the source and the destination on the navigation map. Further, as stated above, in some embodiments, the navigation path may be in terms of Cartesian coordinate point array. The navigation path planning module 201 may then provide the pre-generated navigation path on the navigation map to the offset determination module 205, and to the path correction module 206.

The environment data collection module 202 may receive environment data captured through different sensors (e.g., laser scanner, LIDAR scanner, short range radar, camera, ultrasonic sensor, etc.). The environment data collection module 202 may then construct the environmental FOV from the environment data, and may provide the environmental FOV to the new data point identification module 204. In some embodiments, the environment data collection module 202 may receive currently visible LIDAR data from the LIDAR scanner, and provides the LIDAR data point cloud to the new data point identification module 204. As will be appreciated, the LIDAR data point cloud may include a set of points defined by X, Y, and Z coordinates in a 3D coordinate system.

The vehicle localization module 203 may be responsible for localizing the vehicle on the navigation map. In particular, the vehicle localization module 203 may receive the pre-generated navigation path on the navigation map from the navigation path planning module 201, and localize the vehicle on the pre-generated navigation path. In some of the embodiments, the location of the autonomous vehicle may be determined based on scan data produced by the LIDAR scanner using advanced localization algorithm such as a Monte Carlo localization (MCL) algorithm or an adaptive Monte Carlo localization (AMCL) algorithm. Further, in some embodiments, additional sensor parameters may be employed to fine tune the location of the vehicle on the pre-generated navigation path. For example, in some embodiments, Kalman Filter may be employed to additionally use GPS data or data from any other visual odometer (e.g., camera or LIDAR) to fine tune the exact position of the vehicle. Alternatively or additionally, in some embodiments, odometer reading may be employed to fine tune the exact position of the vehicle on the navigation path. As will be appreciated, more accurate the localization of the vehicle, the better it is for the correction of the pre-generated navigation path. The vehicle localization module 203 may then provide the location of the autonomous vehicle on the navigation map to the new data point identification module 204, and to the offset determination module 205.

The new data point identification module 204 may receive the navigation map from the navigation path planning module 201, the environment FOV from the environment data collection module 204, and the location of the autonomous vehicle on the pre-generated navigation path from the vehicle localization module 203. The new data point identification module 204 may then determine new data points in a pre-defined region with respect to the location of autonomous vehicle based on the environmental FOV and the navigation map. For example, the new data point identification module 204 may identify new relevant LIDAR data points of potential obstacle or potential no-go area at both sideways of the road by comparing LIDAR data points of the environmental FOV with LIDAR data points of the navigation map. It should be noted that the pre-defined region may be a region in front of the vehicle and corresponding to a portion or a segment of the pre-generated navigation path. For example, in some embodiments, the pre-defined region may include a region up to a certain pre-defined distance in front of the autonomous vehicle based on a curvature of the pre-generated navigation path, along each side of the pre-generated navigation path, from a pre-defined start height above a road surface and up to a pre-defined end height above the road surface, and up to a certain distance ahead of the vehicle (e.g., 10 meter). Thus, in some embodiments, sideways may be observed for a segment of the new data points that may be considered almost straight towards the path direction or alignment, and that may not fall or superimpose on any previously captured or marked road boundaries on the navigation map. The new data point identification module 204 may then provide the identified new data points to the offset determination module 205.

The offset determination module 205 may receive the pre-generated navigation path on the navigation map from the navigation path planning module 201, the location of the autonomous vehicle on the pre-generated navigation path from the vehicle localization module 203, and the new data points from the new data point identification module 204. The offset determination module 205 may then determine an offset of the pre-generated navigation path in the pre-defined region based on the set of new data points. In some embodiments, the offset determination module 205 may analyze both side of the road point cloud data up to a certain height, and determine an offset value. For example, the offset determination module 205 may measure how far (perpendicular distance) the pedestrian path way is there from the pre-generated navigation path. Further, in some embodiments, determining the offset may include determining a set of offset distances along the pre-generated navigation path with respect to the set of new data points. In other words, the offset determination module 205 may measure average distance of the new or mismatched data points from current position of vehicle on the pre-generated navigation path and along the pre-generated navigation path at each of the sides of the autonomous vehicle. The offset determination module 205 may then provide the determined offset value(s) to the path correction module 206.

The path correction module 206 may receive the pre-generated navigation path on the navigation map, and the determined offset value(s) from the navigation path planning module 201 and/or the offset determination module 205. The path correction module 207 may then correct a segment of the pre-generated navigation path in the pre-defined region based on the offset value(s) for that segment. This the path correction module 206 may apply the determined offset, and generate a local trajectory segment for vehicle navigation. In some embodiments, correcting the pre-generated navigation path involves determining an actual drivable road width along the pre-generated navigation path based on the set of offset distances, and determining corrected path based on the actual drivable road width. Alternatively, in some embodiments, correcting the pre-generated navigation path involves identifying an intended distance of the autonomous vehicle from an obstacle or a no-go region of at least one side along the pre-generated navigation path, and determining a corrected navigation path based on the intended distance and the set of offset distances.

The navigation module 207 may receive the location of the vehicle, and the corrected navigation path from the path correction module 206. The navigation module 207 may then determine a local plan for navigating the autonomous vehicle based on the location (i.e., the start position) and the corrected navigation path. Further, the navigation module 207 may generate a command velocity for the autonomous vehicle considering a corrected local plan. The navigation module 207 may then provide the corrected navigation path and sequence of command velocities to the vehicle control system for navigating the autonomous vehicle.

It should be noted that the navigation path correction engine 200 may be implemented in programmable hardware devices such as programmable gate arrays, programmable array logic, programmable logic devices, and so forth. Alternatively, the navigation path correction engine 200 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for correcting a pre-generated navigation path for an autonomous vehicle. For example, the exemplary system 100 and the associated navigation path correction engine 200 may correct the pre-generated navigation path for the autonomous vehicle by the processes discussed herein. In particular, as will be appreciated by those of ordinary skill in the art, control logic and/or automated routines for performing the techniques and steps described herein may be implemented by the system 100 and the associated navigation path correction engine 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
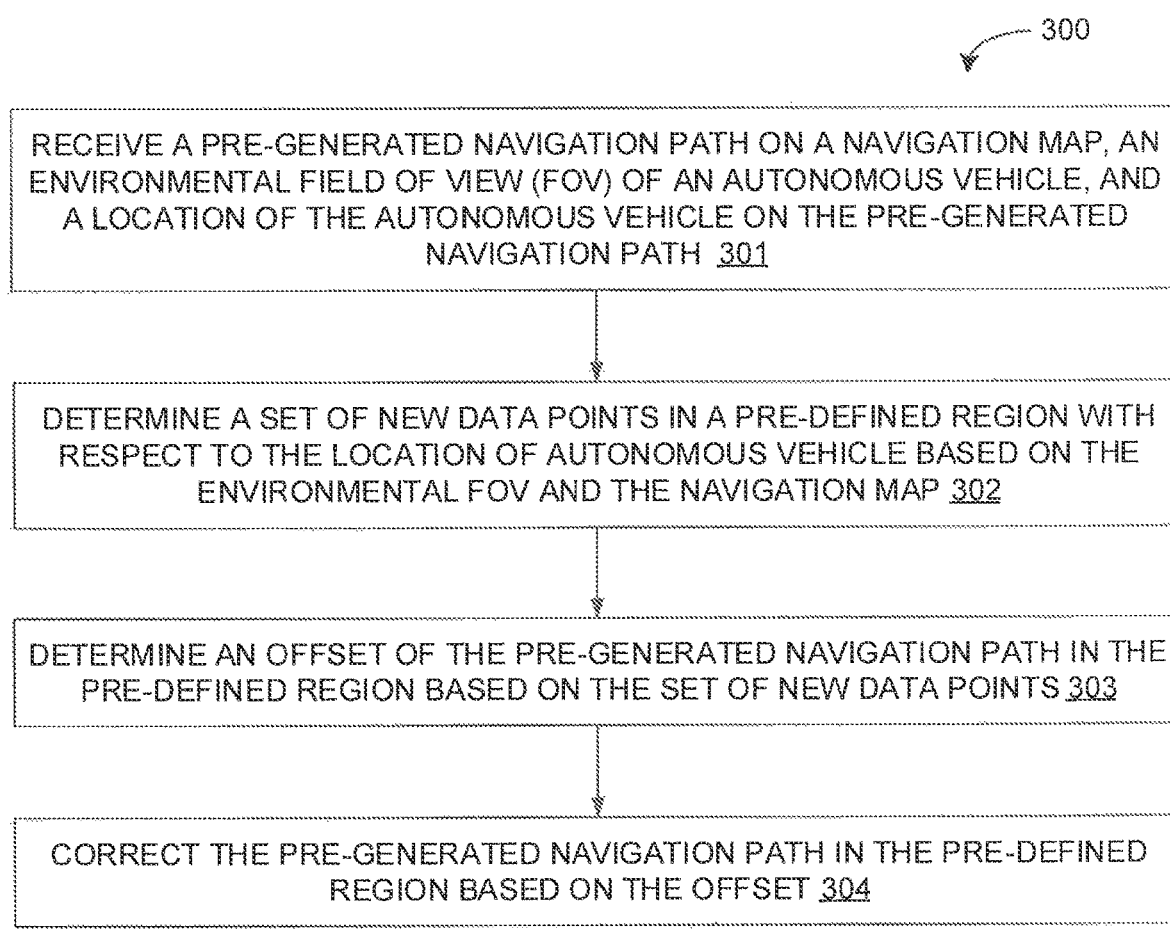
FIG. 3 is a flow diagram of an exemplary process for correcting a pre-generated navigation path for an autonomous vehicle in accordance with some embodiments of the present disclosure.

For example, referring now to FIG. 3, exemplary control logic 300 for correcting a pre-generated navigation path for an autonomous vehicle via a system, such as system 100, is depicted via a flowchart in accordance with some embodiments of the present disclosure. As illustrated in the flowchart, the control logic 300 may include the step of receiving the pre-generated navigation path on a navigation map, an environmental field of view (FOV) of the autonomous vehicle, and a location of the autonomous vehicle on the pre-generated navigation path at step 301. The control logic 300 may further include the step of determining a set of new data points in a pre-defined region with respect to the location of autonomous vehicle based on the environmental FOV and the navigation map at step 302. The control logic 300 may further include the steps of determining an offset of the pre-generated navigation path in the pre-defined region based on the set of new data points at step 303, and correcting the pre-generated navigation path in the pre-defined region based on the offset at step 304.

In some embodiments, the navigation map may be a pre-generated light detection and ranging (LIDAR) map. Additionally, in some embodiments, the environmental FOV may be received from a light detection and ranging (LIDAR) scanner. Further, in some embodiments, the location of the autonomous vehicle may be determined using a Monte Carlo localization algorithm, a geo-positioning system, a visual odometer, an odometer, and so forth.

In some embodiments, the pre-defined region may be a region up to a certain pre-defined distance in front of the autonomous vehicle based on a curvature of the pre-generated navigation path, along each side of the pre-generated navigation path, from a pre-defined start height above a road surface, and up to a pre-defined end height above the road surface. For example if the pre generated navigation path in front of the autonomous vehicle has high curvature, the pre-defined region may have a lower length than a pre-defined threshold length. Additionally, in some embodiments, determining the set of new data points at step 302 may include comparing data points in the pre-defined region of the environmental FOV with data points in the pre-defined region of the navigation map, and identifying a set of data points in the pre-defined region of the environmental FOV that have no corresponding data points in the navigation map within a pre-defined threshold, based on the comparison.

In some embodiments, determining the offset at step 303 may include determining a set of offset distances along the pre-generated navigation path with respect to the set of new data points. Further, in some embodiments, determining each of the set of offset distances may include projecting a virtual ray at a pre-defined projection angle from the autonomous vehicle, computing a distances between the autonomous vehicle and a first data point from the set of new data points in the line of the virtual ray, and computing an offset distance between the pre-generated navigation path and the first data point based on the distance and the pre-defined projection angle.

In some embodiments, correcting the pre-generated navigation path at step 304 may include determining an actual drivable road width along the pre-generated navigation path in the pre-defined region based on the set of offset distances, and determining a corrected navigation path corresponding to the pre-generated navigation path in the pre-defined region, based on the actual drivable road width. Alternatively, in some embodiments, correcting the pre-generated navigation path at step 304 may include identifying an intended distance of the autonomous vehicle from an obstacle or a no-go region of at least one side along the pre-generated navigation path in the pre-defined region, and determining a corrected navigation path corresponding to the pre-generated navigation path in the pre-defined region, based on the intended distance and the set of offset distances.

Figure 4A:
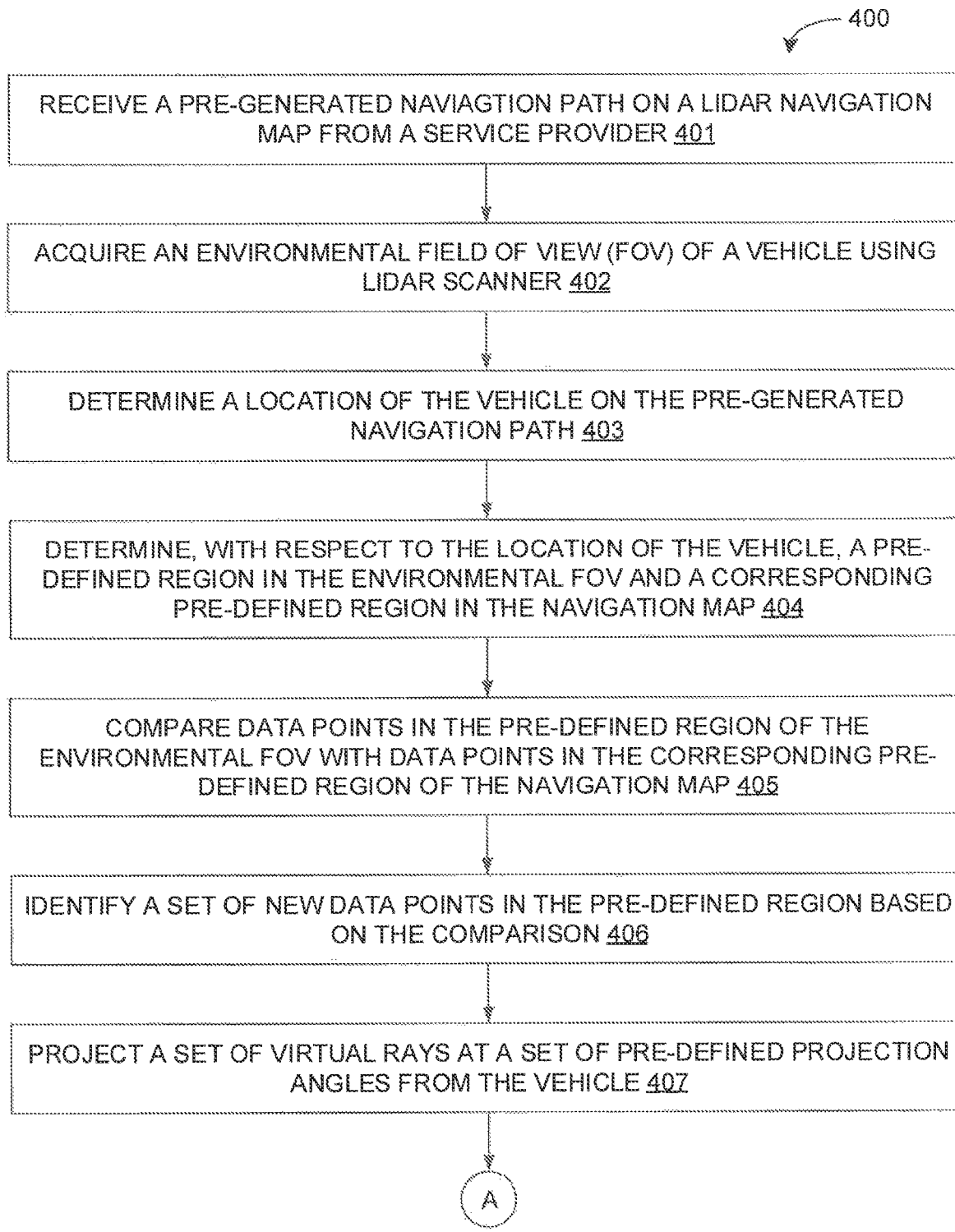
FIGS. 4A and 4B are flow diagrams of a detailed exemplary process for correcting a pre-generated navigation path for an autonomous vehicle using LIDAR data in accordance with some embodiments of the present disclosure.
Figure 4B:
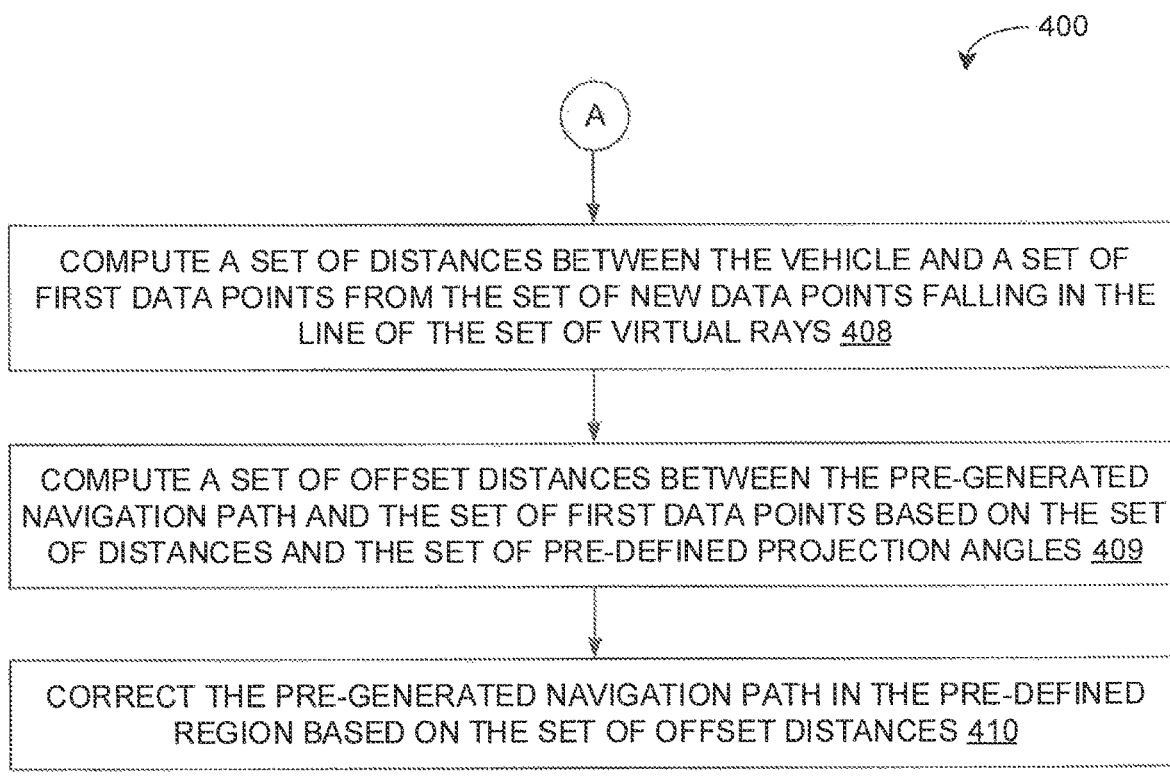

Referring now to FIGS. 4A and 4B, exemplary control logic 400 for correcting a pre-generated navigation path for an autonomous vehicle using LIDAR data is depicted in greater detail via a flowchart in accordance with some embodiments of the present disclosure. As illustrated in the flowchart, the control logic 400 may include the steps of receiving the pre-generated navigation path on a LIDAR navigation map from a service provider at step 401, acquiring an environmental FOV of the autonomous vehicle using a LIDAR scanner at step 402, and receiving or determining a location of the autonomous vehicle on the pre-generated navigation path at step 403.

The control logic 400 may further determine a mismatch of data point clouds of the navigation map and the environmental FOV, and considering it for the correction of the pre-generated path. In particular, the control logic 400 may include the step of determining, with respect to the location of the autonomous vehicle, a pre-defined region in the environmental FOV and a corresponding pre-defined region in the navigation map at step 404. The control logic 400 may further include the steps of comparing data points in the pre-defined region of the environmental FOV with data points in the corresponding pre-defined region of the navigation map at step 405, and identifying a set of new data points in the pre-defined region based on the comparison at step 406. It should be noted that the set of new data points are data points that have no corresponding data points in the navigation map within a pre-defined threshold.

The control logic 400 may further include the step of determining a set of offset distances along the pre-generated navigation path with respect to the set of new data points. Thus, the control logic 400 may include the steps of projecting a set of virtual rays at a set of pre-defined projection angles from the autonomous vehicle at step 407, computing a set of distances between the autonomous vehicle and a set of first data points from the set of new data points falling in the line of the set of virtual rays at step 408, and computing a set of offset distances between the pre-generated navigation path and the set of first data points based on the set of distances and the set of pre-defined projection angles at step 409. The control logic 400 may further include the step of correcting the pre-generated navigation path in the pre-defined region based on the set of offset distances at step 410. Each of the steps 401-410 will be described in greater detail herein below.

At step 401, the navigation device may receive the pre-generated navigation path on the LIDAR navigation map for navigation of the autonomous vehicle. As will be appreciated, the LIDAR navigation map is the pre-generated and static LIDAR map from the service provider. Further, the LIDAR static map includes data point cloud of the geographic region.

At step 402, the navigation device may receive or acquire environmental FOV in form of current or new LIDAR swipe data point cloud. As will be appreciated, LIDAR scanner produces data point cloud from the obstacle's reflection around the vehicle (i.e., 360 degree view). These data points are generated, are stored temporarily (e.g., in volatile memory), and if not recorded, are discarded. Each set of such data providing 360 degree view of the autonomous vehicle at any location is referred to as LIDAR swipe data. The process described here considers such LIDAR swipe data instances for subsequent processing.

At step 403, the navigation device may receive or determine a current location of the autonomous vehicle at a certain point on the pre-generated navigation path on the LIDAR navigation map. For example, as discussed above, the navigation device may localize the autonomous vehicle using advanced localization algorithm (e.g., MCL or AMCL) based on scan data produced from the LIDAR scanner. Further, extended Kalman Filter may be employed to additionally use GPS data or any other visual odometer data (e.g., data from camera) to fine tune the location of the autonomous vehicle on the map. The wheels position based on the odometer reading may further aid in fine tuning the location of the autonomous vehicle along the navigation path.

At step 404, the navigation device defines a region within the environmental FOV and the navigation map for the purpose of comparison and identification of new obstacles (if any). For example, the navigation device may define a region, such as a volumetric area in front of the autonomous vehicle, up to a certain predefined distance depending on curvature of the pre-generated navigation path, along both sides of the pre generated navigation path, starting from a pre-defined height (e.g., 10 centimeter) above a road surface, and ending at a pre-defined height (e.g., 0.5 meter) above the road surface. Thus, it should be noted that, within the defined region, data points on the road surface (i.e., at the ground plane) are not considered for the comparison.

At step 405, the navigation device compares, in the region defined at step 404, the data points of the environmental FOV (i.e., new LIDAR data points, or what the autonomous vehicle actually observes) with the data points of the navigation map (i.e., old static LIDAR data points, or what the autonomous vehicle was supposed to observe). Thus, corresponding to a segment of data points on a LIDAR ring within the defined region of the environmental FOV, which form a near straight line towards or 'in alignment' of the navigation path direction, a matching data points segment is searched for in the LIDAR navigation map within a pre-defined threshold (e.g., 10 cm, 20 cm, 50 cm, etc.). It should be noted that the pre-defined threshold for determining a match (and consequently, for identifying a mismatch) is based on the level of localization. Thus, if the localization is better, then the pre-defined threshold may be lower.

Further, at step 406, if no matching data points are found in the LIDAR navigation map within the pre-defined threshold for some of the data points in the environmental FOV, then those data points in the environmental FOV are considered as new data points. As will be appreciated, the new data points represent new obstacles that were not considered at the time of generating LIDAR navigation map.

Figure 5:
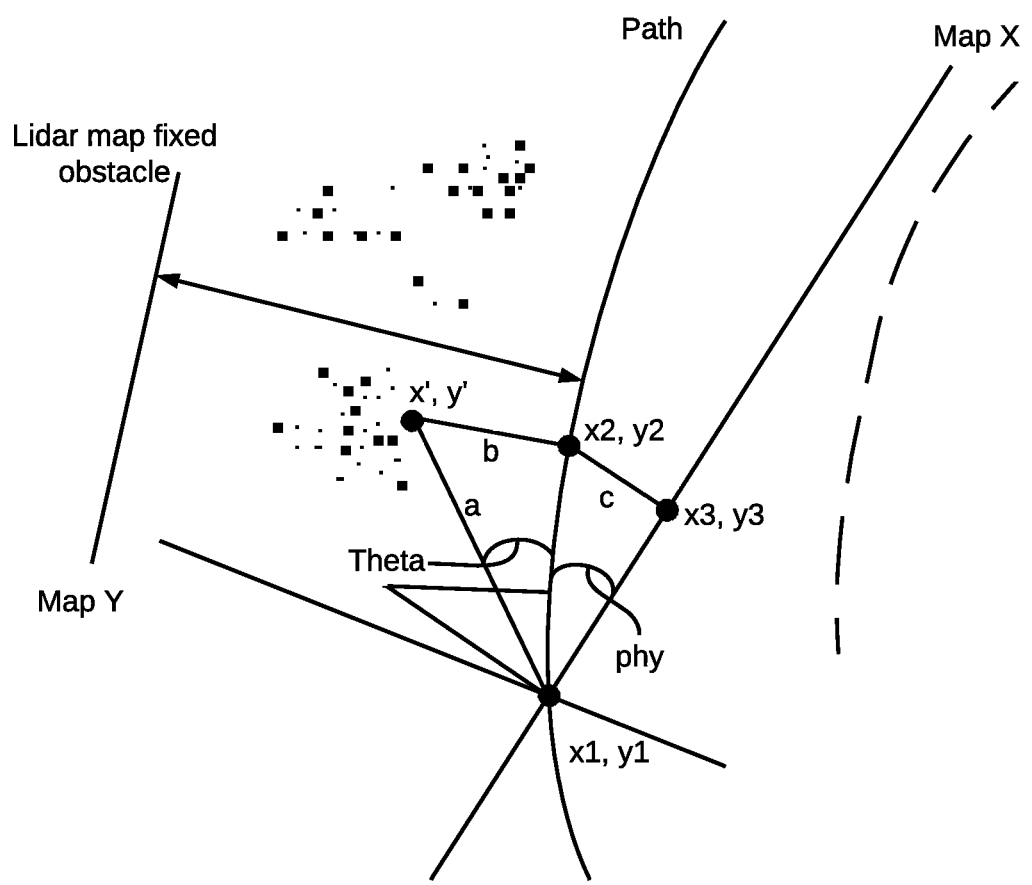
FIG. 5 illustrate an exemplary derivation of a set of offset distances along a pre-generated navigation path in accordance with some embodiments of the present disclosure.

At steps 407-409, the navigation device may process the new data points to determine the set of offset distances along the pre-generated navigation path. Referring now to FIG. 5, an exemplary derivation of the set of offset distances by processing the new data points as per steps 407-409 is illustrated in accordance with some embodiments of the present disclosure. Irrespective of vehicle orientation, a virtual ray projected at a pre-determined angle (say, theta) from the current location (x1, y1) of the autonomous vehicle may hit an obstacle or a first data point (x', y') among the set of new data points at a certain distance (say, 'a') along the line of projection. It should be noted that the projected ray may hit multiple mismatched data points at different distance along the line of projection, but only the first hit may be considered. This data point (x', y') may be at a certain perpendicular distance (say, 'b') from a point (x2, y2) on the pre-generated navigation path. The point (x2, y2) may be at a certain distance (say, 'c') from the autonomous vehicle (x1, y1) along the pre-generated navigation path. As will be appreciated, the perpendicular distance (i.e., 'b') is the offset distance at point (x2, y2). In some embodiments, if the pre-generated navigation path is oriented at an angle (say, phy) with respect to the navigation map, then the computation of the offset distance (i.e., 'b') as well as the point (x2, y2) along the pre-generated navigation path may be as per equations (1)-(9) below:

$$a = \text{Sqrt}(pow(x'-x1, 2) + pow(y'-y1, 2)) \quad \text{Equation (1)}$$

$$b = a * \sin(\text{theta}) \quad \text{Equation (2)}$$

$$c = a * \cos(\text{theta}) \quad \text{Equation (3)}$$

$$\text{Now, } x3 - x1 = c * \cos(phy) \quad \text{Equation (4)}$$

$$x2 = x3 \quad \text{Equation (5)}$$

$$\text{Therefore, } x2 = x1 + c * \cos(phy) \quad \text{Equation (6)}$$

$$\text{Similarly, } y2 - y3 = c * \sin(phy) \quad \text{Equation (7)}$$

$$y3 = y1 \quad \text{Equation (8)}$$

$$\text{Therefore, } y2 = y1 + c * \sin(phy) \quad \text{Equation (9)}$$

Thus, for a derivable point (x2, y2) on the pre-generated navigation path, at distance 'b' substantial obstacle boundary may be present. Now, projecting a virtual ray projected at a different pre-determined angle (say, theta–m) from the current location (x1, y1) of the autonomous vehicle may hit another obstacle or another first data point (x", y") among the set of new data points at a certain distance a' along the line of projection. This data point (x", y") may be at a certain perpendicular distance b' from a point (x2', y2') on the pre-generated navigation path, which may be at a certain distance c' from the autonomous vehicle (x1, y1). Thus, by projecting more virtual rays at other pre-determined angles (say, theta-m, theta-n, etc.) from the current location (x1, y1) of the autonomous vehicle, a set of other offset distances (say, b', b", b''', etc.) may be determined at distance (say, c', c", c''', etc.) along the pre-generated navigation path. It should be noted that, in some embodiments, the set of offset distances (say, b', b", b''', etc.) may be determined up to certain distances (say, c', c", c''', etc.) till which curvature on the pre-generated navigation path is minimal (i.e., within a certain pre-defined threshold). In some embodiments, the projection of virtual rays may start at a pre-defined angle (say, 45 degrees left aligned) and may change by a pre-defined increment (say. 5 degree or 10 degree in clockwise direction). Alternatively, in some embodiments, each of the angles of projection may be pre-defined. Further, as will be appreciated, same exercise may be performed with the right side of the autonomous vehicle, and a set of offset distances (say, b', b", b''') may be so determined.

Figure 6:
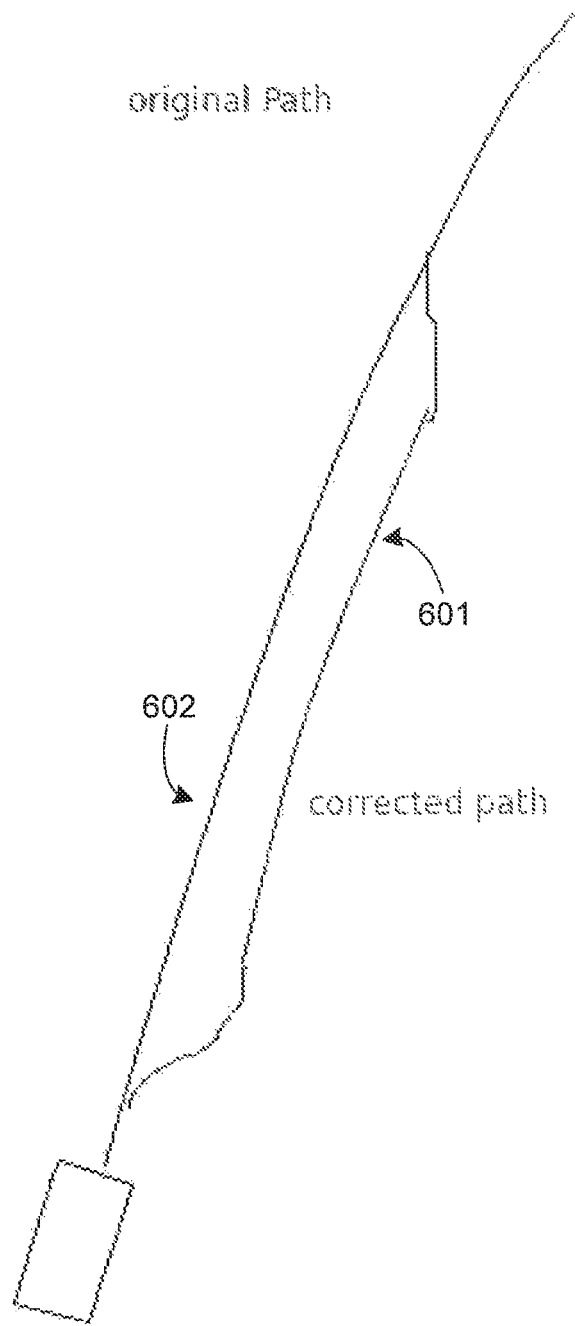
FIG. 6 illustrates an exemplary corrected portion of a pre-generated navigation path in accordance with some embodiments of the present disclosure.

Referring back to FIGS. 4A and 4B, at step 410, the navigation device may correct trajectory of a segment of the pre-generated navigation path with the set of offset distances using a path correction logic. In some embodiments, a correcting measure on the pre-generated navigation path may be provided so as to maintain the autonomous vehicle on center of the actual road area. Alternatively, in some embodiments a correcting measure on the pre-generated navigation path may be provided so as to maintain the autonomous vehicle at a specific distance from each side of an obstacle or a no-go region of at least one side. For example, for a pre-generated navigation path segment (decided while determining a length of the environmental FOV in front of the autonomous vehicle) with little curvature, the most occurring b'+/−(left boundary) and b'+/−(right boundary) may be statistically determined based on probability of occurrence of such values. Thus, b'+b' may be a width of a drivable navigation path. Now, if the autonomous vehicle had been originally intended to be at center of the drivable navigation path, then the pre-generated navigation path may be shifted by |((b'+b')/2−b')| or |((b'+b')/2−b')| so that a corrected navigation path may be in the middle of the determined width of the drivable navigation path. However, if the autonomous vehicle had been originally intended to be at least B meter from an obstacle or a no-go region of a side (say, left boundary), then the pre-generated navigation path may be shifted by |(B−b')| so that a corrected navigation path may be at least B meter from the observed obstacle on the left side. Referring now to FIG. 6, an exemplary portion 601 of a corrected navigation path corresponding to a portion 602 of the pre-generated navigation path is illustrated in accordance with some embodiments of the present disclosure.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
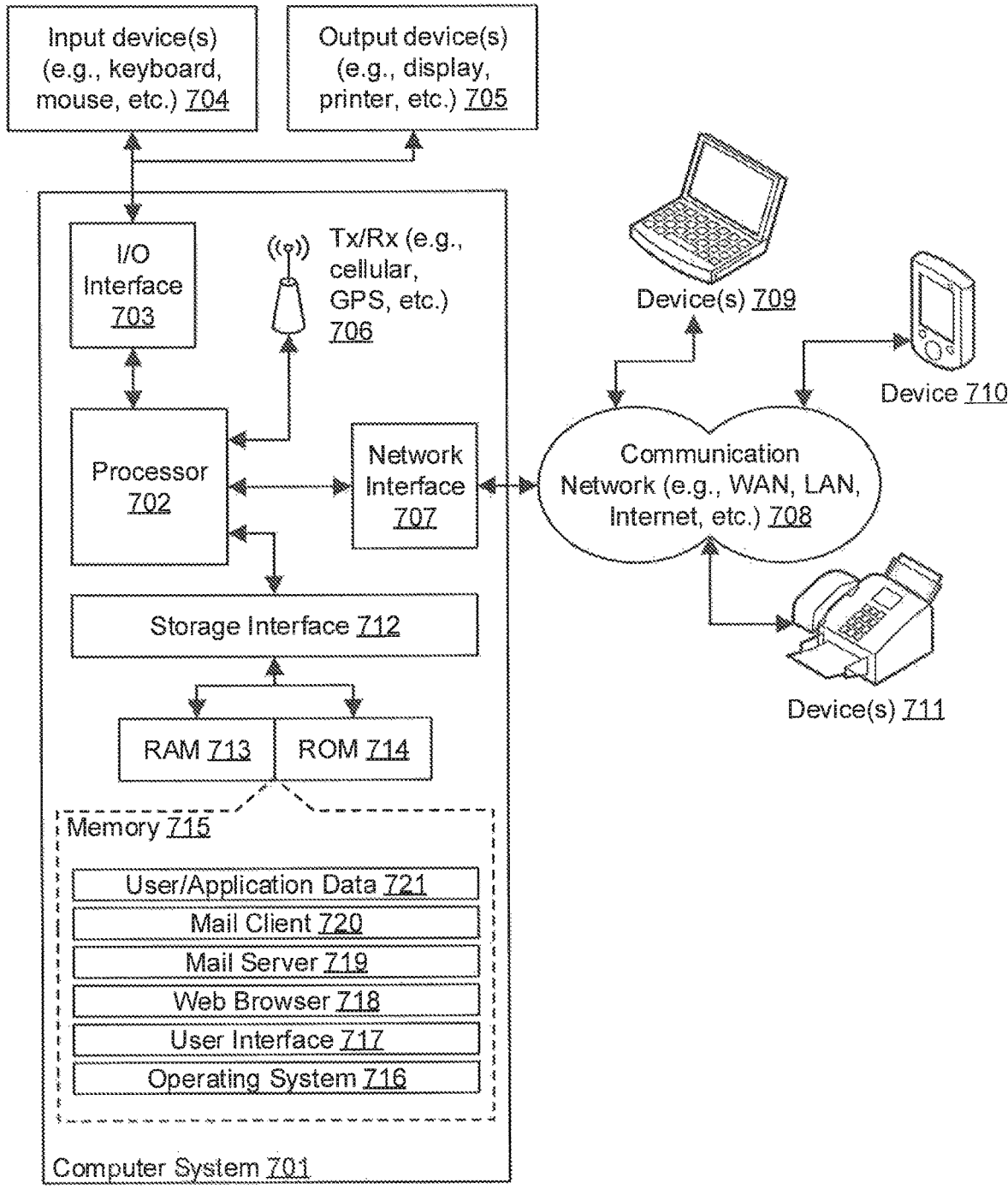
FIG. 7 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 7, a block diagram of an exemplary computer system 701 for implementing embodiments consistent with the present disclosure is illustrated. Variations of computer system 701 may be used for implementing system 100 and navigation path correction engine 200 for correcting a pre-generated navigation path for an autonomous vehicle. Computer system 701 may include a central processing unit ("CPU" or "processor") 702. Processor 702 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 709, 710, and 711. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 702 may be disposed in communication with one or more memory devices (e.g., RAM 713, ROM 714, etc.), collectively referred to as memory 715, via a storage interface 712. The storage interface 712 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices 715 may store a collection of program or database components, including, without limitation, an operating system 716, user interface application 717, web browser 718, mail server 719, mail client 720, user/application data 721 (e.g., any data variables or data records discussed in this disclosure), etc. The operating system 716 may facilitate resource management and operation of the computer system 701. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 701 may implement a web browser 718 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 701 may implement a mail server 719 stored program component. The mail server may be an Internet mail server such as Microsoft Exchange, or the like. The mail server may utilize facilities such as ASP, ActiveX, ANSI C++/C #, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 701 may implement a mail client 720 stored program component. The mail client may be a mail viewing application, such as Apple Mail, Microsoft Entourage, Microsoft Outlook, Mozilla Thunderbird, etc.

In some embodiments, computer system 701 may store user/application data 721, such as the data, variables, records, etc. (e.g., navigation map, pre-generated navigation path, environmental FOV, LIDAR data, projection angles, offset values, corrected navigation path, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above may provide for a correction of the pre-generated navigation path for an autonomous vehicle in an efficient and cost effective manner. The techniques provide for navigation path correction using real-time environment data (acquired via sensors such as LIDAR scanner). It should be noted that the correction of the pre-generated navigation path from source to destination may be performed in segmented manner based on the sensor's look-ahead distance.

In some embodiments, the techniques described above may employ LIDAR scanner to acquire current LIDAR swipe data. The techniques may then observe LIDAR ring one by one, and identify data point cloud forming almost a straight line pattern (feature) of 'road boundary' or any other 'obstruction' that could not be matched with demarcation points on the LIDAR navigation map at same coordinate (x, y) of the data point cloud. Further, based on this observation, the techniques may estimate the error in the vehicle position, where it should be to match the observation (i.e., what the vehicle see (LIDAR data points) and what it is supposed to see (LIDAR navigation map data points). Further, the techniques may employ error/offset determination to correct the pre-generated navigation path trajectory.

The specification has described system and method for correcting a pre-generated navigation path for an autonomous vehicle. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for correcting a pre-generated navigation path for an autonomous vehicle, the method comprising:
    receiving, by a navigation device, the pre-generated navigation path on a navigation map, an environmental field of view (FOV) of the autonomous vehicle, and a location of the autonomous vehicle on the pre-generated navigation path;
    determining, by the navigation device, a set of new data points in a pre-defined region with respect to the location of autonomous vehicle based on the environmental FOV and the navigation map, wherein the pre-defined region is a region up to a certain pre-defined distance in front of the autonomous vehicle based on a curvature of the pre-generated navigation path, along each side of the pre-generated navigation path, from a pre-defined start height above a road surface, and up to a pre-defined end height above the road surface;

determining, by the navigation device, an offset of the pre-generated navigation path in the pre-defined region based on the set of new data points; and correcting, by the navigation device, the pre-generated navigation path in the pre-defined region based on the offset.

2. The method of claim 1, wherein the navigation map is a pre-generated light detection and ranging (LIDAR) map, and wherein the environmental FOV is received from a LIDAR scanner.

3. The method of claim 1, wherein the location of the autonomous vehicle is determined using at least one of a Monte Carlo localization algorithm, a geo-positioning system, a visual odometer, and an odometer.

4. The method of claim 1, wherein determining the set of new data points comprises:
comparing a plurality of data points in the pre-defined region of the environmental FOV with a plurality of data points in the pre-defined region of the navigation map; and
based on the comparison, identifying a set of data points in the pre-defined region of the environmental FOV that have no corresponding data points in the navigation map within a pre-defined threshold.

5. The method of claim 1, wherein determining the offset comprises determining a set of offset distances along the pre-generated navigation path with respect to the set of new data points.

6. The method of claim 5, wherein determining each of the set of offset distances comprises:
projecting a virtual ray at a pre-defined projection angle from the autonomous vehicle;
computing a distance between the autonomous vehicle and a first data point from the set of new data points in the line of the virtual ray; and
computing an offset distance between the pre-generated navigation path and the first data point based on the distance and the pre-defined projection angle.

7. The method of claim 5, wherein correcting the pre-generated navigation path comprises:
determining an actual drivable road width along the pre-generated navigation path in the pre-defined region based on the set of offset distances; and
determining a corrected navigation path, corresponding to the pre-generated navigation path in the pre-defined region, based on the actual drivable road width.

8. The method of claim 5, wherein correcting the pre-generated navigation path comprises:
identifying an intended distance of the autonomous vehicle from an obstacle or a no-go region of at least one side along the pre-generated navigation path in the pre-defined region; and
determining a corrected navigation path, corresponding to the pre-generated navigation path in the pre-defined region, based on the intended distance and the set of offset distances.

9. A system for correcting a pre-generated navigation path for an autonomous vehicle, the system comprising:
a navigation device comprising at least one processor and a computer-readable medium storing instructions that, when executed by the at least one processor, cause the at least one processor to perform operations comprising:
receiving the pre-generated navigation path on a navigation map, an environmental field of view (FOV) of the autonomous vehicle, and a location of the autonomous vehicle on the pre-generated navigation path;

determining a set of new data points in a pre-defined region with respect to the location of autonomous vehicle based on the environmental FOV and the navigation map, wherein the pre-defined region is a region up to a certain pre-defined distance in front of the autonomous vehicle based on a curvature of the pre-generated navigation path, along each side of the pre-generated navigation path, from a pre-defined start height above a road surface and up to a pre-defined end height above the road surface;
determining an offset of the pre-generated navigation path in the pre-defined region based on the set of new data points; and
correcting the pre-generated navigation path in the pre-defined region based on the offset.

10. The system of claim 9, wherein determining the set of new data points comprises:
comparing a plurality of data points in the pre-defined region of the environmental FOV with a plurality of data points in the pre-defined region of the navigation map; and
based on the comparison, identifying a set of data points in the pre-defined region of the environmental FOV that have no corresponding data points in the navigation map within a pre-defined threshold.

11. The system of claim 9, wherein determining the offset comprises determining a set of offset distances along the pre-generated navigation path with respect to the set of new data points.

12. The system of claim 11, wherein determining each of the set of offset distances comprises:
projecting a virtual ray at a pre-defined projection angle from the autonomous vehicle;
computing a distance between the autonomous vehicle and a first data point from the set of new data points in the line of the virtual ray; and
computing an offset distance between the pre-generated navigation path and the first data point based on the distance and the pre-defined projection angle.

13. The system of claim 11, wherein correcting the pre-generated navigation path comprises:
determining an actual drivable road width along the pre-generated navigation path in the pre-defined region based on the set of offset distances; and
determining a corrected navigation path, corresponding to the pre-generated navigation path in the pre-defined region, based on the actual drivable road width.

14. The system of claim 11, wherein correcting the pre-generated navigation path comprises:
identifying an intended distance of the autonomous vehicle from an obstacle or a no-go region of at least one side along the pre-generated navigation path in the pre-defined region; and
determining a corrected navigation path, corresponding to the pre-generated navigation path in the pre-defined region, based on the intended distance and the set of offset distances.

15. A non-transitory computer-readable medium storing computer-executable instructions for:
receiving a pre-generated navigation path on a navigation map, an environmental field of view (FOV) of an autonomous vehicle, and a location of the autonomous vehicle on the pre-generated navigation path;
determining a set of new data points in a pre-defined region with respect to the location of autonomous vehicle based on the environmental FOV and the navigation map, wherein the pre-defined region is a region up to a certain pre-defined distance in front of the autonomous vehicle based on a curvature of the pre-generated navigation path, along each side of the pre-generated navigation path, from a pre-defined start height above a road surface and up to a pre-defined end height above the road surface;

determining an offset of the pre-generated navigation path in the pre-defined region based on the set of new data points; and correcting the pre-generated navigation path in the pre-defined region based on the offset.

16. The non-transitory computer-readable medium of claim 15, wherein determining the set of new data points comprises: comparing a plurality of data points in the pre-defined region of the environmental FOV with a plurality of data points in the pre-defined region of the navigation map; and based on the comparison, identifying a set of data points in the pre-defined region of the environmental FOV that have no corresponding data points in the navigation map within a pre-defined threshold.

17. The non-transitory computer-readable medium of claim 16, wherein determining the offset comprises determining a set of offset distances along the pre-generated navigation path with respect to the set of new data points, and wherein determining each of the set of offset distances comprises:

projecting a virtual ray at a pre-defined projection angle from the autonomous vehicle;

computing a distance between the autonomous vehicle and a first data point from the set of new data points in the line of the virtual ray; and computing an offset distance between the pre-generated navigation path and the first data point based on the distance and the pre-defined projection angle.

18. The non-transitory computer-readable medium of claim 17, wherein correcting the pre-generated navigation path comprises one of:

determining an actual drivable road width along the pre-generated navigation path in the pre-defined region based on the set of offset distances, and determining a corrected navigation path, corresponding to the pre-generated navigation path in the pre-defined region, based on the actual drivable road width; and determining an intended distance of the autonomous vehicle from an obstacle or a no-go region of at least one side along the pre-generated navigation path in the pre-defined region, and determining a corrected navigation path, corresponding to the pre-generated navigation path in the pre-defined region, based on the intended distance and the set of offset distances.

* * * * *